(12) United States Patent
Bajpay et al.

(10) Patent No.: US 8,307,057 B1
(45) Date of Patent: Nov. 6, 2012

(54) METHODS FOR IDENTIFYING AND RECOVERING NON-REVENUE GENERATING NETWORK CIRCUITS ESTABLISHED OUTSIDE OF THE UNITED STATES

(75) Inventors: Paritosh Bajpay, Edison, NJ (US); Robert Best, Highlands Ranch, CO (US); Romelle Bond, Parker, CO (US); Hossein Eslambolchi, Los Altos Hills, CA (US); Richard Glozzy, Hackettstown, NJ (US); Alan Hughes, Lawrenceville, GA (US); John McCanuel, Bailey, CO (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1092 days.

(21) Appl. No.: 11/311,439

(22) Filed: Dec. 20, 2005

(51) Int. Cl.
*G06F 15/173* (2006.01)

(52) U.S. Cl. ........ 709/223; 709/224; 709/225; 709/226; 709/227; 709/228; 709/229; 379/114.02; 379/114.03; 379/114.04; 379/114.05; 379/114.06; 705/28; 705/37

(58) Field of Classification Search .................... 709/227
See application file for complete search history.

(56) References Cited

U.S. PATENT DOCUMENTS

| | | | |
|---|---|---|---|
| 4,873,517 A | 10/1989 | Baratz et al. | |
| 5,067,148 A | 11/1991 | Sardana | |
| 5,353,339 A | 10/1994 | Scobee | |
| 5,404,451 A | 4/1995 | Nemirovsky et al. | |
| 5,416,833 A | 5/1995 | Harper et al. | |
| 5,491,742 A | 2/1996 | Harper et al. | |
| 5,559,877 A | 9/1996 | Ash et al. | |
| 5,583,856 A | 12/1996 | Weir | |
| 5,606,602 A * | 2/1997 | Johnson et al. | 379/114.02 |
| 5,619,496 A | 4/1997 | Weir | |
| 5,629,938 A | 5/1997 | Cerciello et al. | |
| 5,655,149 A | 8/1997 | Muegge et al. | |
| 5,687,224 A | 11/1997 | Alley, Jr. et al. | |
| 5,745,884 A | 4/1998 | Carnegie et al. | |
| 5,784,443 A * | 7/1998 | Chapman et al. | 379/119 |
| 5,881,238 A | 3/1999 | Aman et al. | |
| 5,910,979 A * | 6/1999 | Goel et al. | 379/120 |
| 5,940,373 A | 8/1999 | Chiu et al. | |
| 5,995,602 A * | 11/1999 | Johnson et al. | 379/116 |
| 6,005,925 A * | 12/1999 | Johnson et al. | 379/115.02 |
| 6,078,569 A | 6/2000 | Chandra | |
| 6,098,094 A | 8/2000 | Barnhouse et al. | |
| 6,185,619 B1 | 2/2001 | Joffee et al. | |
| 6,195,354 B1 | 2/2001 | Skalecki et al. | |
| 6,236,642 B1 | 5/2001 | Shaffer et al. | |
| 6,266,322 B1 | 7/2001 | Berger et al. | |

(Continued)

OTHER PUBLICATIONS

"Achieve Operational Efficiency," TelephoneOnline, [online], [retrieved Dec. 19, 2005]. Retrieved from the Internet< URL: http://telephonyonline.com/mag/telecom_taking_stock_inventory/.

*Primary Examiner* — Backhean Tiv

(57) ABSTRACT

A method includes issuing a retrieval instruction, such as a database query, to retrieve from a database system a datum associated with a network circuit established outside of the United States. Upon receiving the datum from the database system, it is determined, based on the datum retrieved, whether the network circuit is incurring a charge. It is further determined, based on the datum retrieved, an amount of revenue generated by the network circuit. When the amount of revenue generated by the network circuit is below a predetermined threshold, a termination instruction to terminate a service associated with the network circuit is issued.

17 Claims, 4 Drawing Sheets

U.S. PATENT DOCUMENTS

| | | | |
|---|---|---|---|
| 6,370,112 | B1 | 4/2002 | Voelker |
| 6,373,929 | B1 * | 4/2002 | Johnson et al. .......... 379/114.02 |
| 6,404,861 | B1 | 6/2002 | Cohen et al. |
| 6,477,595 | B1 | 11/2002 | Cohen et al. |
| 6,510,139 | B1 | 1/2003 | Yoshida |
| 6,529,877 | B1 | 3/2003 | Murphy et al. |
| 6,556,669 | B2 * | 4/2003 | Marchand et al. ....... 379/114.14 |
| 6,724,881 | B1 | 4/2004 | McAllister et al. |
| 6,771,758 | B1 | 8/2004 | Sandel et al. |
| 6,816,585 | B1 | 11/2004 | Blatt et al. |
| 6,856,594 | B1 | 2/2005 | Hayami et al. |
| 6,873,628 | B1 | 3/2005 | Tang |
| 6,877,008 | B1 | 4/2005 | Kirkpatrick et al. |
| 6,898,183 | B1 | 5/2005 | Garakani |
| 6,904,449 | B1 * | 6/2005 | Quinones ...................... 709/203 |
| 6,914,883 | B2 | 7/2005 | Dharanikota |
| 6,920,288 | B2 | 7/2005 | Adleman et al. |
| 6,944,657 | B1 | 9/2005 | Taghadoss |
| 7,039,005 | B2 | 5/2006 | Jenq et al. |
| 7,079,531 | B2 | 7/2006 | Van Dinh et al. |
| 7,092,501 | B2 * | 8/2006 | Maropis et al. ............ 379/114.2 |
| 7,100,092 | B2 | 8/2006 | Allred et al. |
| 7,209,964 | B2 * | 4/2007 | Dugan et al. .................. 709/223 |
| 7,245,874 | B2 | 7/2007 | Rest et al. |
| 7,254,630 | B1 * | 8/2007 | Daude et al. .................. 709/224 |
| 7,269,407 | B2 * | 9/2007 | Carmon et al. ................ 455/406 |
| 7,321,656 | B2 * | 1/2008 | Bevente et al. .......... 379/121.02 |
| 7,340,515 | B2 | 3/2008 | Walker et al. |
| 7,373,415 | B1 | 5/2008 | DeShan et al. |
| 7,424,526 | B1 | 9/2008 | Hansen et al. |
| 7,461,274 | B2 | 12/2008 | Merkin |
| 7,610,233 | B1 * | 10/2009 | Leong et al. ..................... 705/37 |
| 7,752,301 | B1 * | 7/2010 | Maiocco et al. ............. 709/224 |
| 7,987,122 | B2 * | 7/2011 | Bevente et al. ................. 705/34 |
| 2002/0004390 | A1 | 1/2002 | Cutaia et al. |
| 2002/0015485 | A1 | 2/2002 | Bhusri |
| 2002/0087674 | A1 * | 7/2002 | Guilford et al. .............. 709/223 |
| 2002/0101820 | A1 | 8/2002 | Gupta et al. |
| 2002/0107881 | A1 | 8/2002 | Patel |
| 2002/0191250 | A1 | 12/2002 | Graves et al. |
| 2003/0014332 | A1 * | 1/2003 | Gramling ........................ 705/28 |
| 2003/0055749 | A1 | 3/2003 | Carmody et al. |
| 2003/0076832 | A1 | 4/2003 | Ni |
| 2003/0198180 | A1 | 10/2003 | Cambron |
| 2004/0052216 | A1 | 3/2004 | Roh |
| 2004/0062370 | A1 * | 4/2004 | O'Neal et al. ............ 379/112.01 |
| 2004/0062371 | A1 * | 4/2004 | Maropis et al. ............ 379/114.2 |
| 2005/0021713 | A1 * | 1/2005 | Dugan et al. .................. 709/223 |
| 2005/0055288 | A1 * | 3/2005 | Bevente et al. ................. 705/30 |
| 2005/0243716 | A1 | 11/2005 | Bitar et al. |
| 2005/0246246 | A1 * | 11/2005 | Nishimoto et al. ............. 705/28 |
| 2006/0029203 | A1 | 2/2006 | Bhusri |
| 2006/0059262 | A1 * | 3/2006 | Adkinson et al. ............. 709/225 |
| 2006/0067237 | A1 | 3/2006 | Burns et al. |
| 2007/0121851 | A1 * | 5/2007 | Maropis et al. .......... 379/127.05 |
| 2007/0130015 | A1 * | 6/2007 | Starr et al. ....................... 705/14 |
| 2007/0183426 | A1 * | 8/2007 | Daude et al. .................. 370/392 |
| 2008/0069324 | A1 * | 3/2008 | Bevente et al. .......... 379/114.22 |

\* cited by examiner

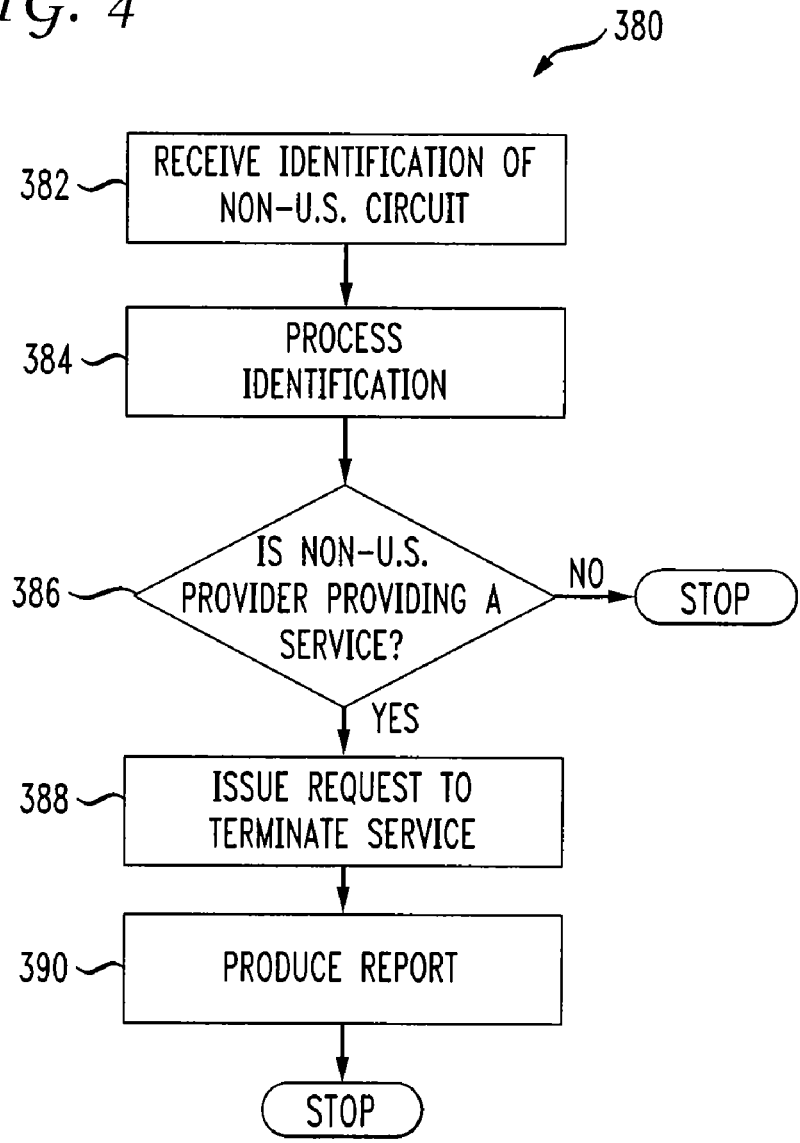

METHODS FOR IDENTIFYING AND RECOVERING NON-REVENUE GENERATING NETWORK CIRCUITS ESTABLISHED OUTSIDE OF THE UNITED STATES

CROSS-REFERENCE TO RELATED APPLICATIONS

This application is related to U.S. patent application Ser. No. 11/311,411, entitled "Methods of Identifying and Recovering Underutilized Network Facilities," filed on even date herewith, which is incorporated herein by reference in its entirety.

This application is related to U.S. patent application Ser. No. 11/311,440, entitled "Method of Identifying and Recovering Stranded Internet Protocol Ports," filed on even date herewith, which is incorporated herein by reference in its entirety.

This application is related to U.S. patent application Ser. No. 11/311,436, entitled "Method of Identifying and Recovering Stranded Network Facilities," filed on even date herewith, which is incorporated herein by reference in its entirety.

This application is related to U.S. patent application Ser. No. 11/311,438, entitled "Methods for Identifying and Recovering Stranded and Access-No-Revenue Network Circuits," filed on even date herewith, which is incorporated herein by reference in its entirety.

This application is related to U.S. patent application Ser. No. 11/311,437, entitled "Systems and Methods for Optimizing Existing Circuits within a Telecommunication Network," filed on even date herewith, which is incorporated herein by reference in its entirety.

This application is related to U.S. patent application Ser. No. 11/311,421, entitled "Methods of Optimizing the Configuration of Underutilized Signal Processors within a Telecommunication Network," filed on even date herewith, which is incorporated herein by reference in its entirety.

BACKGROUND

The invention relates generally to communication networks and methods, and more particularly to methods and systems for recovering network circuits established outside of the United States that are incurring a connectivity charge but that are not generating sufficient revenue.

Telecommunications service providers use many different types of network circuits to provide a variety of telecommunication services. Such services can include, for example, providing access to an internet protocol ("IP") network or a voice network to end users located in various different countries. When an end user requires such service, a service provider establishes a connection from the end user's equipment to a network. This involves designing and building an appropriate circuit to establish a path from the customer site to the edge nodes within a network, assigning available network facilities for use in building the circuit, and connecting or "building" the designed circuit.

Establishing service in this manner can involve multiple service providers located in different countries. For example, an end user may contract with a U.S.-based inter-exchange carrier ("IXC") to provide a network service between a location outside of the United States and a location within the United States. The IXC may in turn contract with one or more service providers located outside of the United States, also referred to as international telecommunications service providers ("ITSP's") to provide one or more dedicated circuits outside of the United States to connect the end user's equipment to the IXC's core network. The ITSP's generally charge the IXC a fee in exchange for providing such circuits.

IXC's generally employ various systems and databases to facilitate establishing and/or allocating circuits to connect an end user's equipment located outside of the United States to a U.S.-based network. For example, an ordering database can include the details about the end user's service request, such as the bandwidth desired, the point of origination, and the point of destination. An inventory database can include a listing of the edge nodes and circuits that are available for connecting the end user's equipment to the network. Finally, an interface system can be used to request an appropriate circuit from an ITSP.

A circuit connecting an end user's equipment to a network can fall into disuse for a variety of reasons, such as when the end user discontinues or changes a service associated with the circuit. In instances where the circuit is provided by an ITSP, until the contracting IXC properly terminates services associated with the circuit, the an ITSP will often continue to charge the contracting IXC a fee associated with the circuit. Those circuits that are incurring a charge but that are generating insufficient revenue are often referred to as "access-no-revenue" circuits.

Known network management systems do not review the status of network circuits established outside of the United States to determine whether such circuits are considered as access-no-revenue circuits. Thus, a need exists for methods and systems for identifying and recovering network circuits established outside of the United States that are considered as access-no-revenue circuits.

SUMMARY

A method includes issuing a retrieval instruction, such as a database query, to retrieve from a database system a datum associated with a network circuit established outside of the United States. Upon receiving the datum from the database system, it is determined, based on the datum retrieved, whether the network circuit is incurring a charge. It is further determined, based on the datum retrieved, an amount of revenue generated by the network circuit. When the amount of revenue generated by the network circuit is below a predetermined threshold, a termination instruction to terminate a service associated with the network circuit is issued.

BRIEF DESCRIPTION OF THE DRAWINGS

FIGS. 3 and 4 are flow charts illustrating methods according to various embodiments of the invention.

DETAILED DESCRIPTION

The invention relates to systems and methods for identifying and recovering network circuits established outside of the United States that are incurring a charge but that are not generating sufficient revenue. A method includes issuing a retrieval instruction, such as a database query, to retrieve from a database system a datum associated with a network circuit established outside of the United States. Upon receiving the datum from the database system, it is determined, based on the datum retrieved, whether the network circuit is incurring a charge. It is further determined, based on the datum retrieved, an amount of revenue generated by the network circuit. When the amount of revenue generated by the network circuit is below a predetermined threshold, a termination instruction to terminate a service associated with the network circuit is issued.

In some embodiments, a method includes receiving an identification of a network circuit established outside of the United States that is incurring a cost and generating an amount of revenue below a predetermined threshold. Based on the received identification, it is then verified automatically whether a service provider outside of the United States is providing a service associated with the network circuit. When it is verified that the non-U.S. service provider is providing the service a request is issued automatically to the non-U.S. service provider to terminate the service.

The term "circuit" or "network circuit" is used herein to mean a communication path between two or more nodes that is established by interconnecting a set of network facilities. A network circuit can be physical in nature, including facilities such as the transmission lines, switches and/or other physical network facilities that are connected to establish a communication path between network nodes. As such, a network circuit can be connected by physically making the necessary hardware connections to establish the circuit. Alternatively, a circuit can be virtual in nature, including facilities such as software identifiers associated with facilities, the software identifiers being allocated to establish a communication path between network nodes. Therefore, a circuit also can be connected by allocating the necessary facilities within a network management system or database to establish a circuit. A circuit is considered to be established outside of the United States when one or more of the network facilities included within the circuit resides outside of the United States.

Figure 1:
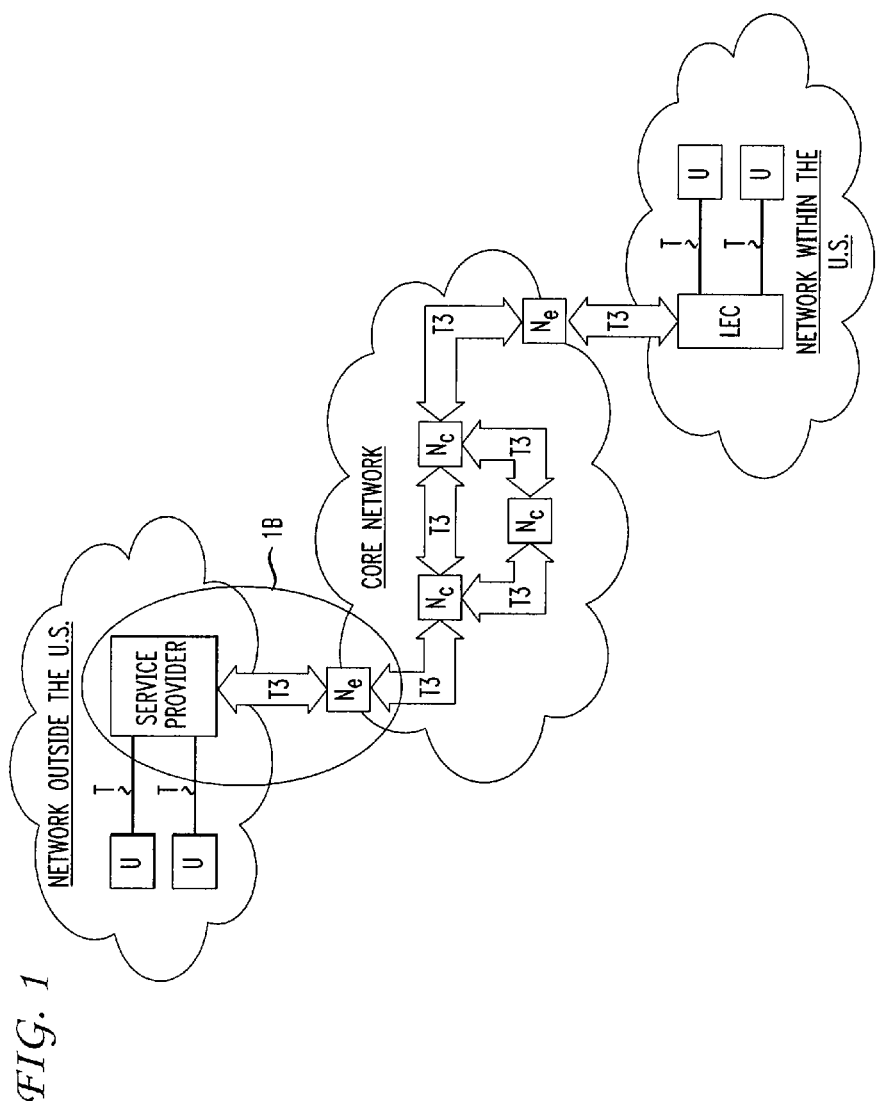
FIG. 1 is a schematic illustration of various circuits residing within and between a core network, a local network within the United States and a local network outside of the United States.

FIG. 1 is a schematic illustration of various facilities included within a core network, managed by an inter-exchange carrier ("IXC"), a local network located outside of the United States and a local network located within the United States. As illustrated, the core network includes a series of edge nodes, labeled as $N_e$, and core nodes, labeled as N. The edge nodes $N_e$ can be, for example, edge switches that provide a point of user access to the core network. Similarly, the core nodes $N_c$ can be core switches that reside wholly within the core network that interconnect the edge switches. As illustrated, the edge nodes $N_e$ and the core nodes $N_e$ are interconnected by a series of transmission lines T3, which can be, for example, high-bandwidth T3 trunk lines. Network circuits can be created within the core network by interconnecting the nodes and transmission lines, thereby providing an efficient means of transporting communication signals across long distances.

An end user U can gain access to the core network via a local network that can be located outside the United States or within the United States. By allowing both domestic and international local networks to access the core network an IXC can provide international service. As illustrated, when the end user U is located within the United States, the end user's equipment is connected by a transmission line T to a central office managed by a local exchange carrier ("LEC"). Such LECs include local phone companies within the United States that have regulatory rights and responsibilities for providing telecommunication services within a specified geographic region. Similarly, when the end user U is located outside of the United States, the end user's equipment is connected by a transmission line T to an office or switch managed by an international telecommunications service provider ("ITSP"). Depending on the local regulations, the ITSP can be a private entity or a governmental body. The LEC office and the ITSP office, in turn, provide a connection to an edge node $N_e$ within the core network via a transmission line T3, which can include the signals from multiple end users U. In this manner, a network circuit is established through which the end user U located either within or outside of the United States can access the core network. Such a network circuit can be, for example, a DS0 voice circuit.

In some instances an end user U may contract directly with an IXC to provide network service between various locations. Because in many cases the end user's equipment is not directly connected to an edge node within a core network, the IXC may in turn arrange for a LEC and/or an ITSP to provide one or more network circuits to connect the end user's equipment to edge nodes $N_e$ within a core network, as illustrated in FIG. 1. In return for providing the network access circuits, the LEC and/or the ITSP generally charges the IXC a fee associated with supplying incoming circuits to the core network.

The term "access-no-revenue" ("ANR") is used herein to describe a network circuit that is connected and incurring a charge, that is expected to generate revenue, but that does not generate sufficient revenue. An ANR circuit can either be in use or not in use, depending on the circumstances. For example, in some instances, an end user may be using a connected circuit that is incurring a charge, but that is not generating revenue. Such a scenario can occur when a request made by the end user to disconnect services is only partially processed, thereby leaving the circuit connected while ceasing to bill the end user.

Figure 2:
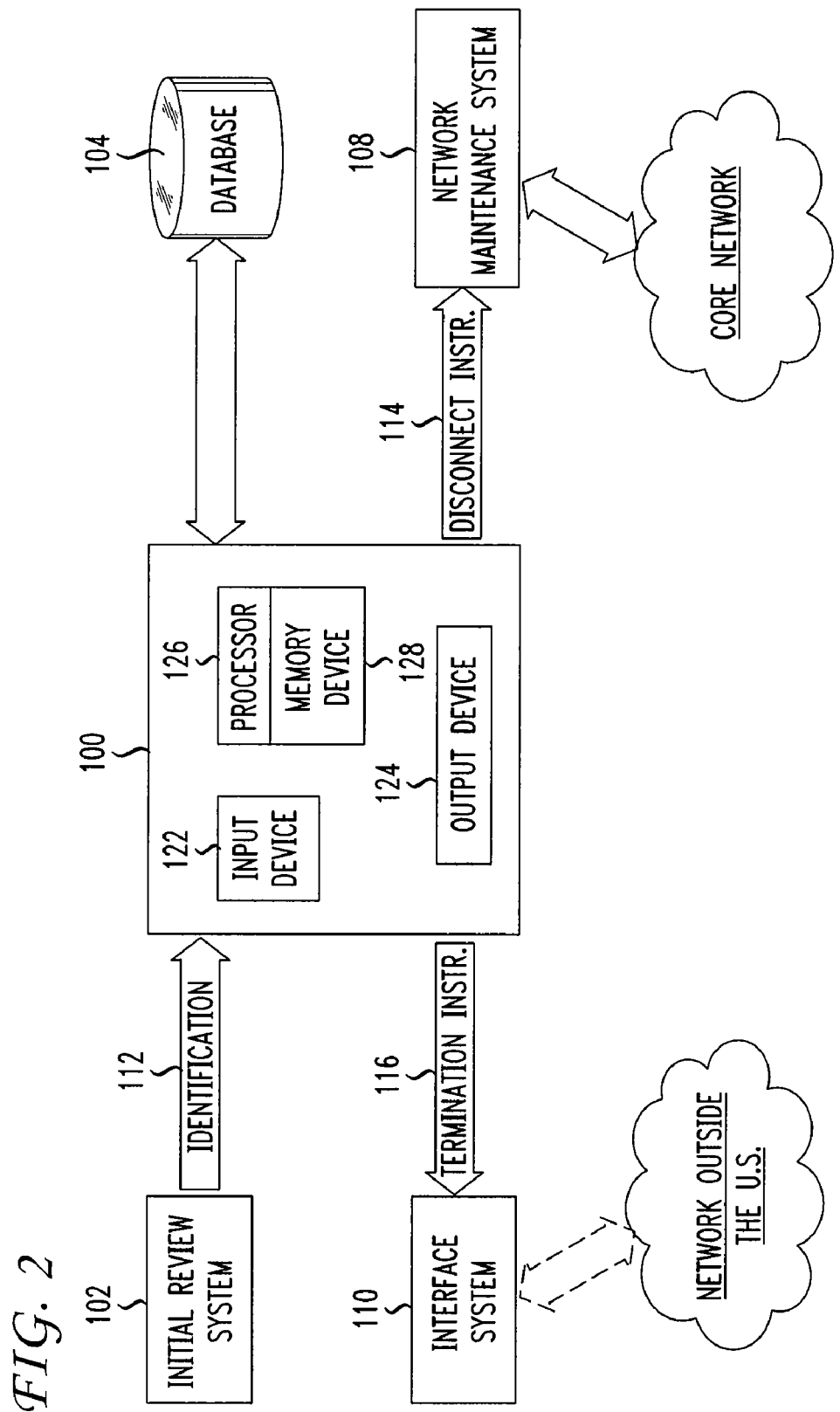
FIG. 2 is a schematic illustrating a system for recovering access-no-revenue network circuits established outside of the United States according to an embodiment of the invention.

FIG. 2 is a schematic illustration of a circuit recovery system 100 for recovering ANR circuits established outside of the United States according to an embodiment of the invention. The circuit recovery system 100 includes a processor 126 and a memory device 128. The illustrated circuit recovery system 100 also includes an input device 122 configured to receive input from an external source, such as an initial review system 102 or a database system 104, as described below. Similarly, the circuit recovery system 100 includes an output device 124 configured to provide output to an external device, such as a network maintenance system 108 or an interface system 110, as described below.

The circuit recovery system 100 is configured to receive an identification 112 of a potentially ANR circuit from an initial review system 102. In some embodiments, the initial review system 102 includes an asset recovery manager ("ARM") who generates a list of potentially ANR circuits by reviewing certain network database systems. For example, an ARM may generate a list including all network circuits established outside the United States that are associated with an edge switch that was recently upgraded. In other embodiments, the initial review system 102 is a software-based system that generates a list of potentially ANR circuits by sorting circuits according to their status. For example, the initial review system 102 can produce a list of all circuits established in a specific country for a specific end user.

Upon receiving the identification 112, the circuit recovery system 100 issues an instruction to a database system 104 to retrieve data associated with the identified network circuit. The circuit recovery system 100 then receives the data returned by the database system 104. In some embodiments, the circuit recovery system 100 is configured to issue a plurality of instructions to a plurality of database systems 104, as will be discussed in more detail below.

Upon receiving data associated with the network circuit from the database system 104, the circuit recovery system 100 determines whether the network circuit is classified as ANR based on the received data. Because of the complexities that can arise with establishing circuits outside of the United States, this determination can include any number of different operations. Furthermore, such intermediate operations can be different depending on the country in which the circuit is located. For example, the circuit recovery system 100 may need to take into account the local customs and regulations when determining whether a network circuit is incurring a charge. Such regulations may impose a tax that is easily attributed to the use of the network circuit. Conversely the local customs may including leasing a block of circuits, the charge for which cannot be attributed to any one particular circuit. As such, in some embodiments, the circuit recovery system 100 employs a rules-based algorithm to determine whether a circuit is classified as ANR. Such a rules-based algorithm can, for example, determine that a network circuit established outside the United States is ANR if a specific number of predetermined criteria are met. Such criteria can include whether the charges incurred by the network circuit are classified as local taxes, connectivity charges and/or per minute usage charges, whether a disconnect order associated with the circuit has been placed within a predetermined time period, and/or whether the amount of revenue generated by the circuit within a predetermined time period is below a predetermined amount.

When the circuit recovery system 100 determines that a network circuit established outside the United States is ANR, the circuit recovery system 100 issues an instruction 116 to terminate a service associated with the circuit. In this manner, the circuit recovery system 100 can eliminate a charge that may be imposed by an ITSP for a circuit that is no longer generating revenue. In the illustrated embodiment, the circuit recovery system 100 issues a single instruction 116 to an interface system 110 that interfaces with an ITSP. The interface system 110 can be a processor-based system that interfaces with one or more ITSP's to coordinate services provided by the ITSP's, such as connecting an end user located outside of the United States to the IXP's core network. In other embodiments, however, the circuit recovery system 100 issues a plurality of instructions to a plurality of interface systems.

In some instances, however, the circuit recovery system 100 will not issue a termination request 116 when a circuit is found to be ANR. For example, in some instances circuits established by an ITSP are leased in large blocks to an IXC on a long-term basis. As such, the service associated with such circuits cannot be terminated on an individual basis. When an end user assigned such a circuit discontinues service, therefore, it is important that the IXC network management systems reflect the availability of the network circuit so that it can be reassigned to a new end user. The circuit recovery system 100 accomplishes this by issuing an instruction 114 to disconnect the circuit within the IXC's network management systems when the circuit is determined to be ANR. In some embodiments, the circuit recovery system 100 issues both an instruction 116 to terminate a service associated with a circuit and an instruction 114 to disconnect a circuit when the circuit is determined to be ANR.

In the illustrated embodiment, the circuit recovery system 100 issues a single instruction 114 to a network maintenance system 108 that interfaces with a core network to disconnect the network circuit. In other embodiments, the circuit recovery system 100 issues a plurality of instructions to a plurality of different systems. For example, in some embodiments the circuit recovery system 100 issues one instruction to a network maintenance system to disconnect the stranded circuit and another instruction to a database system to include the disconnected circuit in a list of network facilities available for reassignment.

In some embodiments, the circuit recovery system 100 monitors the interface system 110 to verify that the ITSP has terminated a service associated with the network circuit. For example, the circuit recovery system 100 can be configured to receive a verification notice from the interface system 110 indicating that the instruction 116 has been successfully completed. In other embodiments, the circuit recovery system 100 queries a database system or series of database systems 104 to determine whether the ITSP is continuing to charge a fee associated with the network circuit.

In some embodiments, the circuit recovery system 100 monitors a network maintenance system 108 to verify that the network circuit has been disconnected. For example, the circuit recovery system 100 can be configured to receive a verification notice from the network maintenance system 108 indicating that the instruction 114 has been successfully completed. In other embodiments, the circuit recovery system 100 queries a database system or series of database systems 104 to determine whether the network circuit has been disconnected within the IXC's network management systems and made available for reassignment.

The illustrated circuit recovery system 100 includes a processor 126 and a memory device 128. The processor 126 can be a commercially-available processing device configured to perform one or more specific tasks. For example, the processor 126 can be a commercially-available microprocessor. Alternatively, the processor 126 can be an application-specific integrated circuit (ASIC) or a combination of ASICs, which are designed to perform one or more specific functions. In yet other embodiments, the processor 126 can be an analog or digital circuit, or a combination of multiple circuits.

The memory device 128 can include one or more types of memory. For example, the memory device 128 can include a read only memory (ROM) component and a random access memory (RAM) component. The memory device 128 can also include other types of memory suitable for storing data in a form retrievable by the processor 126, for example, electronically programmable read only memory (EPROM), erasable electronically programmable read only memory (EEPROM), or flash memory.

Although the circuit recovery system 100 is illustrated and described as including a processor 126, a memory device 128, an input device 122 and an output device 124, in some embodiments, the system can include software in the form of processor-readable code instructing a processor to perform the functions described herein. In other embodiments, the circuit recovery system 100 can include firmware that performs the functions described herein.

Although the circuit recovery system 100 and the interface system 110 are shown and described above as being separate systems, in some embodiments the functions of the circuit recovery system 100 and the interface system 110 can be performed by a single processor-based system. Similarly, in some embodiments, the functions of the circuit recovery system 100 and the network maintenance system 108 can be performed by a single processor-based system.

The operations performed by the circuit recovery system 100 and/or the interface system 110 can be done either automatically or manually. An operation is done automatically when it is done without any human intervention. For example, in some embodiments, the circuit recovery system 100 automatically determines whether a network circuit established outside the United States is incurring a charge based on the received data, by using a rules-based algorithm as described above. In other embodiments, however, the circuit recovery system 100 may require input from a user (not shown in FIG. 2) prior to issuing an instruction to terminate a service associated with a circuit.

Figure 3:
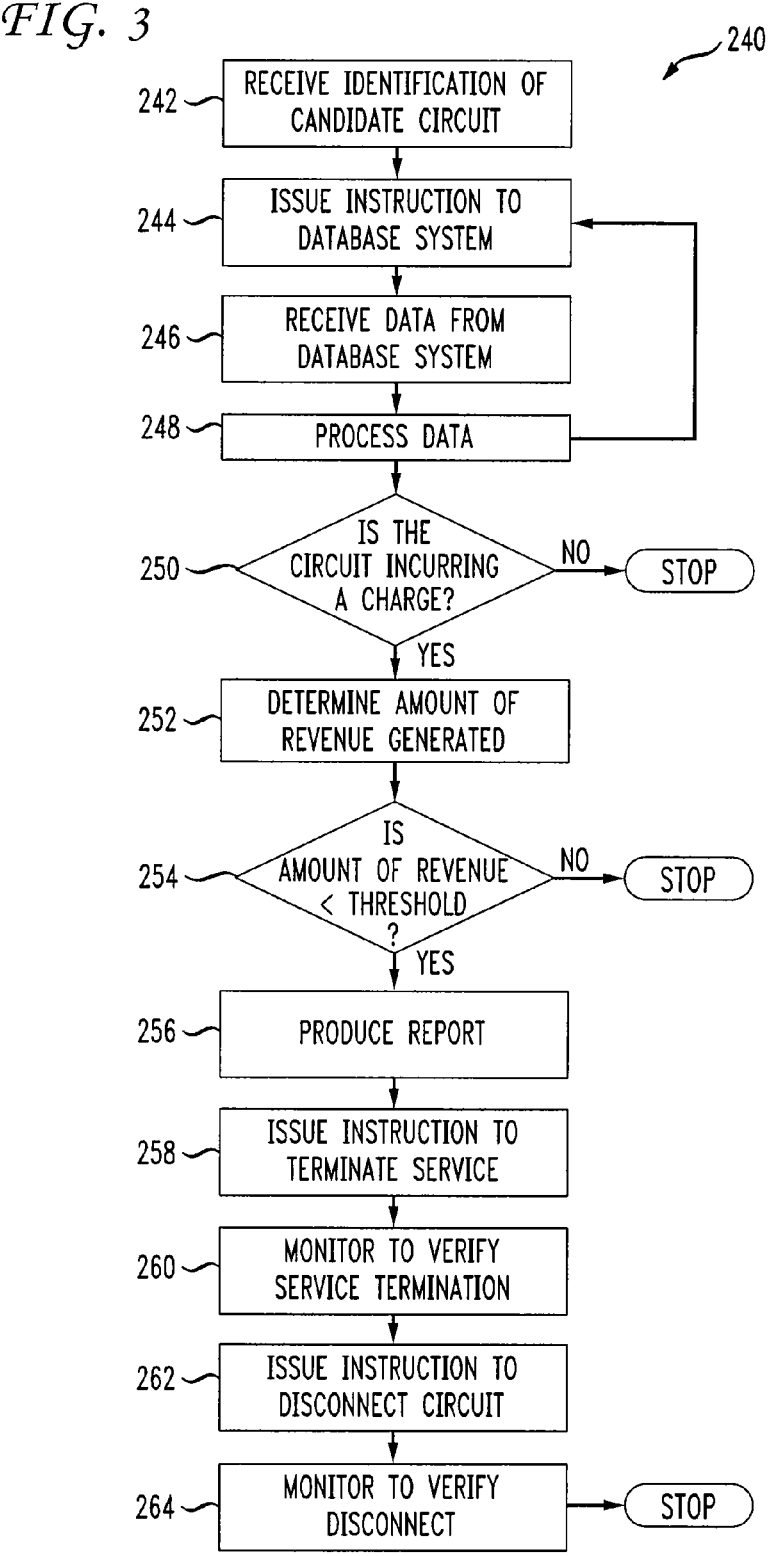

FIG. 3 is a flow chart illustrating a method 240 of recovering network circuits established outside of the United States that are ANR according to an embodiment of the invention. The illustrated method includes receiving an identification of a potentially ANR network circuit, 242. The identification can be supplied by a database system or software program configured to provide an initial review of network circuits, as described above. The identification can include a variety of information. For example, in some embodiments, the identification includes a software identifier associated with the network circuit. In other embodiments, the identification includes additional information about the identified network circuit, such as the date on which the network circuit was connected or the end user to which the network circuit is assigned. In yet other embodiments, the identification includes information pertaining to a plurality of network circuits.

Similarly, the identification can be received in a variety of different formats. In some embodiments, the identification is received in ASCII format. In other embodiments, the identification is received in binary or any other machine-readable format. In yet other embodiments, the identification is received as a data file attached to an e-mail.

Upon receiving the identification, the illustrated method includes issuing an instruction to a database system to retrieve data associated with the identified network circuit, 244. In some embodiments, the method includes issuing a plurality of instructions to the same database system or, alternatively, issuing a plurality of instructions to a plurality of different database systems. Such database systems can include an ordering database system, an inventory database system, an engineering database system, a provisioning database system, a billing database system, or a maintenance database system. The instruction can be in the form of a query to retrieve specific data from the database system. Such data can include an identification and status of other network circuits assigned to the same customer, an identification and status of other network circuits located adjacent to the identified network circuit, and/or the billing cycle associated with the network circuit.

The illustrated method includes receiving data returned by a database system in response to the issued instruction, 246, processing the data, 248, and determining whether the identified network circuit is incurring a charge, 250. In some embodiments, the determining whether the identified network circuit is incurring a charge, 250, is accomplished using a rules-based algorithm. For example, the rules-based algorithm can determine that a network circuit is incurring a charge if a certain number of predetermined criteria are met. Such criteria can include, for example, whether charges incurred by the network circuit are classified as local taxes, connectivity charges and/or per minute usage charges, whether any charges have incurred within a predetermined time period, and/or whether blanket charges incurred can be allocated to a specific circuit. In other embodiments, the operations of issuing instructions, 244, receiving data, 246, and processing the data, 248, are accomplished in an iterative fashion. For example, a first instruction can be issued requesting data associated with the identified network circuit from a first database. After processing of the received data is complete, if it is not possible to determine whether the identified network circuit is incurring a charge, a second instruction can be issued requesting data from a second database. In this manner, the method is adaptable to a variety of different conditions.

When it is determined that a network circuit is stranded, the method includes determining the amount of revenue generated by the identified network circuit, 252, and determining whether the amount of revenue is below a predetermined threshold, 254. The amount of revenue generated can be determined in a number of different ways. For example, the revenue can be calculated as a gross revenue over a predetermined time period, a monthly average, and/or a net revenue on a monthly basis. Similarly, the predetermined threshold can be set to according to any number of factors, such as, for example, the type of circuits being analyzed, the country in which the network circuit was established and/or the end user to whom the network circuit was assigned. For example, an E1 circuit established in France can have one threshold while a DS0 circuit established in Japan can have another threshold. In some embodiments, the threshold is zero, thereby identifying non-revenue producing circuits. In other embodiments, however, the threshold is not zero.

When it is determined that a network circuit established outside the United States is incurring a charge and is not generating sufficient revenue, the illustrated method includes producing automatically a report, 256. In some embodiments, the report can include information about a plurality of circuits analyzed. Such information can include, for example, information characterizing the amount of charges incurred by each network circuit, a ranking of the network circuits according to the charges incurred and revenue generated, and/or a grouping of ANR circuits by an end user identity.

The report can be produced in a variety of different formats, such as ASCII format, binary format, or as a data file attached to an e-mail. In some embodiments, the report is output to a user interface device, such as a terminal or printer (not shown in FIG. 2). In other embodiments, however, the operation of producing a report is not required for the successful implementation of the method.

When it is determined that a network circuit established outside the United States is incurring a charge and is not generating sufficient revenue, the illustrated method includes issuing an instruction to terminate a service associated with the network service, 258. The instruction can be issued in any number of formats, such as ASCII text format, literal English format, or binary format. In some embodiments, a method includes issuing a single instruction to an interface system configured to terminate the service associated with the network circuit, thereby eliminating the charges incurred. In other embodiments, however, a method includes issuing a plurality of instructions to a plurality of interface systems. Such instructions can be in any number of formats Once the instruction to terminate a service has been issued, the illustrated method includes monitoring an interface system to verify that the service has been terminated, 260. In some embodiments, the monitoring is accomplished by receiving an indication from the interface system indicating that the service has been terminated. In other embodiments, the monitoring is accomplished by querying a database system to verify that records associated with network circuit indicate that the service has been terminated.

When it is determined that a network circuit established outside the United States is incurring a charge and is not generating sufficient revenue, the method includes issuing an instruction to disconnect the network circuit, 262. In some embodiments, the method includes issuing a single instruction to an IXC network maintenance system configured to disconnect the network circuit, thereby making it available for reassignment. In other embodiments, the method includes issuing a plurality of instructions to a plurality of different IXC systems to disconnect the stranded network circuit. For example, the method can include issuing a first instruction to a network maintenance system to disconnect the stranded network circuit and a second instruction to an inventory database system to update records associated with the stranded network circuit.

The illustrated method includes monitoring a network maintenance system to verify that the network circuit has been disconnected and made available for reuse, 264. In some embodiments, the monitoring is accomplished by receiving an indication from a network maintenance system indicating that the network circuit has been disconnected. In other embodiments, the monitoring is accomplished by querying a database system to verify that records associated with network circuit have been updated to reflect that the network circuit is available for reassignment.

FIG. 4 is a flow chart illustrating a method 380 of terminating automatically a service associated with a network circuit established outside of the United States that is incurring a charge and is no longer generating sufficient revenue according to an embodiment of the invention. The illustrated method includes receiving an identification associated with a network circuit established outside of the United States, 382. The identification can be received in a variety of different formats. In some embodiments, for example, the identification is a software address associated with a network circuit that is received in ASCII format. In other embodiments, the identification is received in binary or any other machine-readable format. In yet other embodiments, the identification includes a listing of several network circuits that have been determined to be incurring a charge and no longer generating sufficient revenue.

Upon receiving the identification, the method includes processing the identification, 384 and determining whether an international telecommunications service provider ("ITSP") is providing a service associated with the identified circuit, 386. Such service can include, for example, providing access to a core network within the United States. In some embodiments, the determining whether an ITSP is providing service is accomplished by querying an ITSP billing database to determine if an ITSP is generating bills associated with the network circuit. In other embodiments, the determining whether a ITSP is providing service is accomplished by querying an accounting database to determine if a service associated with the network circuit is being paid for.

When it is determined that an ITSP is providing a service associated with a network circuit, the method includes issuing automatically a request to the ITSP to terminate the service associated with the network circuit, 388. This method, therefore, prevents a service provider from paying for services provided by an ITSP that are not used. Because each ITSP has different systems, the request for termination can be issued in any number of different formats. Upon issuing the request for termination, the method includes producing a report to indicate those network circuits for which a request to terminate services has been sent, 390. This serves as a mechanism for verifying that the request for service termination as been issued.

In some embodiments, the operations described above can be performed automatically by one or more processor-based systems as shown in FIG. 2 and described above. In other embodiments, some of the operations described above can be performed manually. In yet other embodiments, a rules-based algorithm is used to determine whether an operation will be performed manually or automatically. For example, in some embodiments, an instruction to terminate services associated with a network circuit will be issued automatically when each criteria of a set of criteria is satisfied. The algorithm will require that the termination instruction be issued manually, however, if only a subset of the set of criteria is satisfied.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A method, comprising:
  issuing a retrieval instruction to retrieve a datum associated with a network circuit established outside of the United States from a database system;
  determining, by a processor, based on the datum retrieved from the database system whether the network circuit is incurring a charge;
  determining based on the datum retrieved from the database system an amount of revenue generated by the network circuit;
  determining if the network circuit is part of a block of network circuits that is leased, wherein the block of network circuits that is leased does not allow the charge to be attributed to any one network circuit of the block of network circuits; and
  issuing a termination instruction to terminate a service associated with the network circuit when the network circuit is not part of the block of network circuits that is leased, when the network circuit is incurring the charge and when the amount of revenue generated by the network circuit that is not part of the block of network circuits that is leased is below a predetermined threshold that indicates that the network circuit is deemed to be an access-no-revenue circuit, wherein the predetermined threshold is based on a type of network circuit being analyzed and a country that the network circuit is established in.

2. The method of claim 1, wherein the network circuit includes a DS0 circuit.

3. The method of claim 1, wherein the determining whether the network circuit is incurring the charge is done automatically.

4. The method of claim 1, wherein the determining the amount of revenue generated by the network circuit is done automatically.

5. The method of claim 1, wherein the issuing the termination instruction is done automatically.

6. The method of claim 1, further comprising verifying that the service associated with the network circuit has been terminated when the termination instruction has been issued.

7. The method of claim 1, further comprising issuing a disconnect instruction to disconnect the network circuit when the network circuit is incurring the charge and when the amount of revenue generated by the network circuit is below a predetermined threshold.

8. The method of claim 1, further comprising:
  issuing automatically a disconnect instruction to disconnect the network circuit when the network circuit is incurring the charge and when the amount of revenue generated by the network circuit is below the predetermined threshold; and verifying that the network circuit has been disconnected when the disconnect instruction has been issued.

9. The method of claim 1, wherein the network circuit includes an E1 circuit.

10. The method of claim 1, wherein the network circuit includes an E3 circuit.

11. A method comprising:

receiving an identification of a network circuit established outside of the United States that is not part of a block of network circuits that is leased, wherein the block of network circuits that is leased does not allow a charge to be attributed to any one network circuit of the block of network circuits, when the network circuit is incurring a cost and is generating an amount of revenue below a predetermined threshold that indicates that the network circuit that is not part of the block of network circuits that is leased is deemed to be an access-no-revenue circuit, wherein the predetermined threshold is based on a type of network circuit being analyzed and a country that the network circuit is established in;

verifying, by a processor, automatically whether a service provider outside of the United States is providing a service associated with the network circuit; and issuing automatically a request to the service provider to terminate the service when it is verified that the service provider is providing the service.

12. The method of claim 11, further comprising producing a report when the request to the service provider is issued.

13. The method of claim 11, wherein the network circuit includes a DS0 circuit.

14. The method of claim 11, wherein the network circuit includes an E1 circuit.

15. The method of claim 11, wherein the network circuit includes an E3 circuit.

16. A tangible memory device storing code representing instructions, which when executed to cause a processor to perform operations, the operations comprising:

issuing a retrieval instruction to retrieve from a database system a datum associated with a network circuit established outside of the United States;

determining based on the datum whether the network circuit is incurring a charge;

determining based on the datum an amount of revenue generated by the network circuit;

determining if the network circuit is part of a block of network circuits that is leased, wherein the block of network circuits that is leased does not allow the charge to be attributed to any one network circuit of the block of network circuits; and producing automatically a report when the network circuit is not part of a block of network circuits that is leased, when the network circuit is incurring the charge and when the amount of revenue generated by the network circuit that is not part of the block of network circuits that is leased is below a predetermined threshold that indicates that the network circuit is deemed to be an access-no-revenue circuit, wherein the predetermined threshold is based on a type of network circuit being analyzed and a country that the network circuit is established in.

17. The tangible memory device of claim 16, further comprising:

verifying whether a service provider outside of the United States is providing a service associated with the network circuit;

issuing a termination instruction to terminate the service associated with the network circuit when it is verified that the service provider is providing the service; and verifying that the service associated with the network circuit has been terminated when the termination instruction has been issued.

* * * * *